US010846610B2

(12) United States Patent
Kutzkov et al.

(10) Patent No.: US 10,846,610 B2
(45) Date of Patent: Nov. 24, 2020

(54) SCALABLE SYSTEM AND METHOD FOR REAL-TIME PREDICTIONS AND ANOMALY DETECTION

(71) Applicant: NEC Laboratories Europe GmbH, Heidelberg (DE)

(72) Inventors: Konstantin Kutzkov, London (GB); Mathias Niepert, Heidelberg (DE); Mohamed Ahmed, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 924 days.

(21) Appl. No.: 15/230,517

(22) Filed: Aug. 8, 2016

(65) Prior Publication Data
US 2017/0228660 A1    Aug. 10, 2017

Related U.S. Application Data

(60) Provisional application No. 62/291,580, filed on Feb. 5, 2016.

(51) Int. Cl.
*G06N 20/00* (2019.01)
*G06Q 30/02* (2012.01)
*G06N 5/00* (2006.01)

(52) U.S. Cl.
CPC .............. *G06N 20/00* (2019.01); *G06N 5/003* (2013.01); *G06Q 30/0251* (2013.01)

(58) Field of Classification Search
CPC ......... G06N 20/00; G06F 17/30; G06F 11/30; G08G 1/0967; G08G 1/096
See application file for complete search history.

(56) References Cited

U.S. PATENT DOCUMENTS

| | | | |
|---|---|---|---|
| 5,513,854 A | 5/1996 | Daver | |
| 6,677,858 B1 | 1/2004 | Faris et al. | |
| 6,707,487 B1 | 3/2004 | Aman et al. | |
| 6,784,826 B2 | 8/2004 | Kane et al. | |
| 7,408,502 B2 | 8/2008 | Percy et al. | |
| 8,462,048 B2 | 6/2013 | Percy et al. | |
| 9,130,988 B2 * | 9/2015 | Seifert | H04L 63/168 |
| 9,152,882 B2 * | 10/2015 | Hedau | G06K 9/6227 |
| 9,558,670 B1 * | 1/2017 | Sheth | G01C 21/005 |
| 2002/0165731 A1 | 11/2002 | Dempsey | |
| 2007/0005419 A1 | 1/2007 | Horvitz et al. | |

(Continued)

OTHER PUBLICATIONS

Ikonomovska, "Regression on Evolving Multi-Relational Data Streams", ACM New York (Year: 2011).*
Ikonomovska, "Regression on Evolving Multi-Relational Data Streams", ACM New York, 2011 (Year: 2011).*
Ben-Haim, "A Streaming Parallel Decision Tree Algorithm" (Year: 2010).*
Nguyen, "An L1-regression Random Forests Method for Forecasting of Hoa Binh Reservoir's Incoming Flow" (Year: 2015).*

(Continued)

*Primary Examiner* — Ann J Lo
*Assistant Examiner* — Van C Mang
(74) *Attorney, Agent, or Firm* — Leydig, Voit & Mayer, Ltd.

(57) ABSTRACT

A method detects an event or anomaly in real-time and triggers an action based thereon. A stream of data is received from data sources. The data includes at least two categorical features and a real-value measurement. Sketching is performed on the features using min-wise hashing to create sketches of the data. A regression tree is learnt on the sketches so as to estimate a mean squared error. It is determined whether an event or anomaly exists based on the mean squared error. An action is triggered based on at least one of a type, location or magnitude of the determined event or anomaly.

16 Claims, 2 Drawing Sheets

(56) References Cited

U.S. PATENT DOCUMENTS

| | | | |
|---|---|---|---|
| 2008/0045234 A1 | 2/2008 | Reed | |
| 2008/0134043 A1* | 6/2008 | Georgis | H04N 7/10 715/733 |
| 2008/0270346 A1* | 10/2008 | Mehta | G06F 16/24542 |
| 2009/0319507 A1* | 12/2009 | Chen | G06F 16/24578 |
| 2011/0276440 A1 | 11/2011 | Collins et al. | |
| 2012/0134043 A1* | 5/2012 | Annampedu | G11B 5/59661 360/31 |
| 2012/0137367 A1* | 5/2012 | Dupont | G06F 21/00 726/25 |
| 2012/0274481 A1* | 11/2012 | Ginsberg | G08G 1/096775 340/905 |
| 2013/0151522 A1* | 6/2013 | Aggarwal | G06F 16/24568 707/737 |
| 2013/0157684 A1 | 6/2013 | Moser et al. | |
| 2015/0160035 A1 | 6/2015 | Longo et al. | |
| 2017/0046683 A1* | 2/2017 | Shaw | G06Q 30/0202 |
| 2017/0108236 A1* | 4/2017 | Guan | H05B 47/19 |

OTHER PUBLICATIONS

Nelson, "Fast Manhattan Sketches in Data Streams", (Year: 2010).*

Andrei Z. Broder, et al., „Min-Wise Independent Permutations, Journal of Computer and System Sciences, vol. 60, issue 3, Jun. 2000, pp. 630-659.

Ziv Bar-Yossef, et al., "Counting Distinct Elements in a Data Stream", Processing Random '02 Proceedings of the 6$^{th}$ International Workshop on Randomization and Approximation Techniques, pp. 1-10, Dec. 2000.

Pedro Domingos, et al., "Mining high-speed data streams", KDD '00 Proceedings of the sixth ACM SIGKDD international conference on Knowledge discovery and data mining, pp. 71-80, Dec. 2002.

Yael Ben-Haim, et al., „A Streaming Parallel Decision Tree Algorithm, Journal of Machine Learning Research 11, Feb. 2010, pp. 849-872.

Apache Samoa, https://samoa.incubator.apache.org/documentation/ Vertical-Hoeffding-Tree-Classifier.html, Dec. 2014, p. 1.

* cited by examiner

BUILDREGRESSIONTREE
Input: sketches $sk(x_1), \ldots, sk(x_n)$, max depth $d$, error threshold $\delta$ 1: $T = \emptyset$
2: $P = \emptyset$
3: $optimal = False$
4: while $T.depth < d$ and not optimal do
5: $\quad optimal = True$
6: $\quad$ for all leafs $T[P] \in T$ do
7: $\quad\quad$ for $((x_l^{(i)}, \ldots, x_r^{(i)}) \in \mathcal{X} \setminus P$ do
8: $\quad\quad\quad (P \wedge X_l^i, P \wedge X_r^i, error_i) = \text{ESTIMATESPLITERROR}(T[P], (sk(x_l^{(i)}), \ldots, sk(x_r^{(i)})), sk(P))$
9: $\quad\quad (X_l^{opt}, X_r^{opt}, error_{opt}) = \text{argmax}_i(P \wedge X_l^i, P \wedge X_r^i, error_i)$
10: $\quad\quad$ if $error_P - error_{opt} \geq \delta$ then
11: $\quad\quad\quad optimal = False$
12: $\quad\quad\quad P_l = P \wedge X_l^{opt}$
13: $\quad\quad\quad P_r = P \wedge X_r^{opt}$
14: $\quad\quad\quad$ Split as $T[P_l], T[P_r]$

FIG. 2

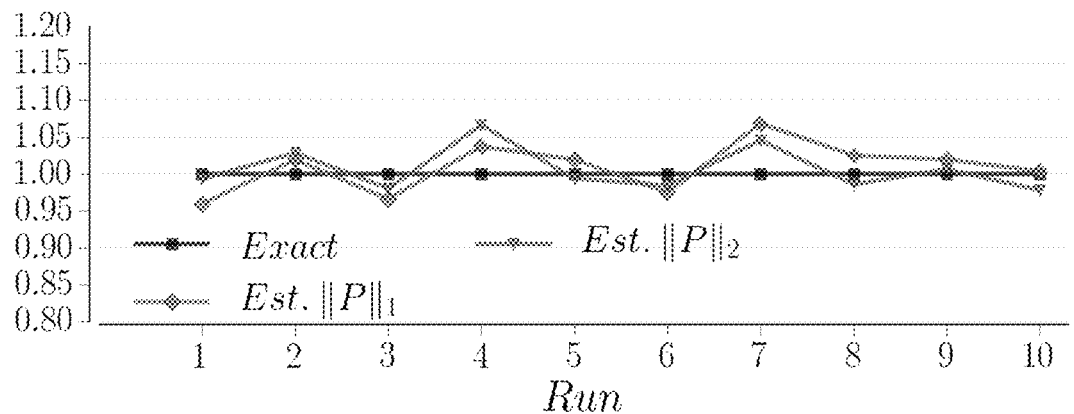

FIG. 3

SCALABLE SYSTEM AND METHOD FOR REAL-TIME PREDICTIONS AND ANOMALY DETECTION

CROSS-REFERENCE TO PRIOR APPLICATION

Priority is claimed to U.S. Provisional Patent Application No. 62/291,580 filed on Feb. 5, 2016, the entire disclosure of which is hereby incorporated by reference herein

FIELD

The present invention relates to a scalable system and method for detecting crowds in real-time or near real-time, referred to hereinafter as real-time. A crowd, for example, can be a number of objects or persons exceeding a threshold or expectation for a certain location or area. The invention proposes a system and method which uses regression trees to identify crowds and anomalous situations in a manner which is considerably faster and/or requires significantly less computational resources than heretofore possible.

The present invention further relates to a recommendation system, a flight management system and a weather station and a method which uses regression trees to make predictions and/or recommendations in real-time which can process larger streams of data faster and/or using significantly less computational resources than heretofore possible.

BACKGROUND

Domingos, Pedro M. and Hulten, Geoff, "Mining high-speed data streams," in proceedings of the sixth ACM SIGKDD international conference on knowledge discovery and data mining, pp. 71-80, 2000 presented the first algorithm for decision and regression tree learning in data streams. The algorithm works by incrementally building a tree. Incoming examples are navigated to the leafs until there are enough samples to decide on a splitting. It is argued that the stream is generated from some distribution and the examples represent samples independently drawn from it. Under this assumption, using Chernoff-Hoeffding bounds, theoretical guarantees are obtained for the number of required examples to make an approximately correct splitting decision. An immediate problem is that the assumptions are often not realistic. Apache Samoa, <<https://samoa.incubator.apache.org/documentation/Vertical-Hoeffding-Tree-Classifier.html>> (last visited Jan. 28, 2016) describes another sampling method.

Ben-Haim, Yael and Tom-Tov, Elad, "A streaming parallel decision tree algorithm," J. Mach. Learn. Res., 11:849-872, March 2010 present a decision-tree learning algorithm that works on histograms of the data. The algorithm can be seen as a multi-pass streaming algorithm that incrementally builds a decision tree. Even if no precise bounds on the cardinality of the histogram are shown, the algorithm yields good results and adapts to different feature distributions. However, the method is slow and cannot be performed in real-time.

Kpotufe, Samory and Orabona, Francesco, "Regression-tree tuning in a streaming setting," in 27th Annual Conference on Neural Information Processing Systems, NIPS 2013, pp. 1788-1796, 2013 present an online algorithm for learning a tree based regressor for a function $f$ which satisfies a Lipschitz condition. The main contribution is an online algorithm for high dimensional data with low intrinsic dimensionality such that examples that are close to each other in the low-dimensional space are assigned to the same leaf in the tree. The algorithm does not achieve space savings in terms of the size of the original data. Leveraging AMS sketching Alon, Noga, Matias, Yossi, and Szegedy, Mario, "The space complexity of approximating the frequency moments," J. Comput. Syst. Sci., 58(1):137-147, 1999 and Yu, Zhenglin, Ge, Zihui, Lall, Ashwin, Wang, Jia, Xu, Jun (Jim), and Yan, He, "Crossroads: A practical data sketching solution for mining intersection of streams," in Proceedings of the 2014 Internet Measurement Conference, IMC 2014, pp. 223-234, 2014 present a sketching algorithm that learns the average weight of examples described by two categorical features. Essentially, this means that if the original data contains n features and examples are described by k discrete features, then the total number of considered features increases as $O(n^{k/2})$.

SUMMARY

In an embodiment the present invention provides a method for detecting an event or anomaly in real-time and triggering an action based thereon. A stream of data is received from data sources. The data includes at least two categorical features and a real-value measurement. Sketching is performed on the features using min-wise hashing to create sketches of the data. A regression tree is learnt on the sketches so as to estimate a mean squared error. It is determined whether an event or anomaly exists based on the mean squared error. An action is triggered based on at least one of a type, location or magnitude of the determined event or anomaly.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 2 shows an exemplary pseudo-code for a regression learning tree;

FIG. 3 is a graph of estimates of the mean for several runs of the algorithm in the system of FIG. 1.

DETAILED DESCRIPTION

Figure 1:
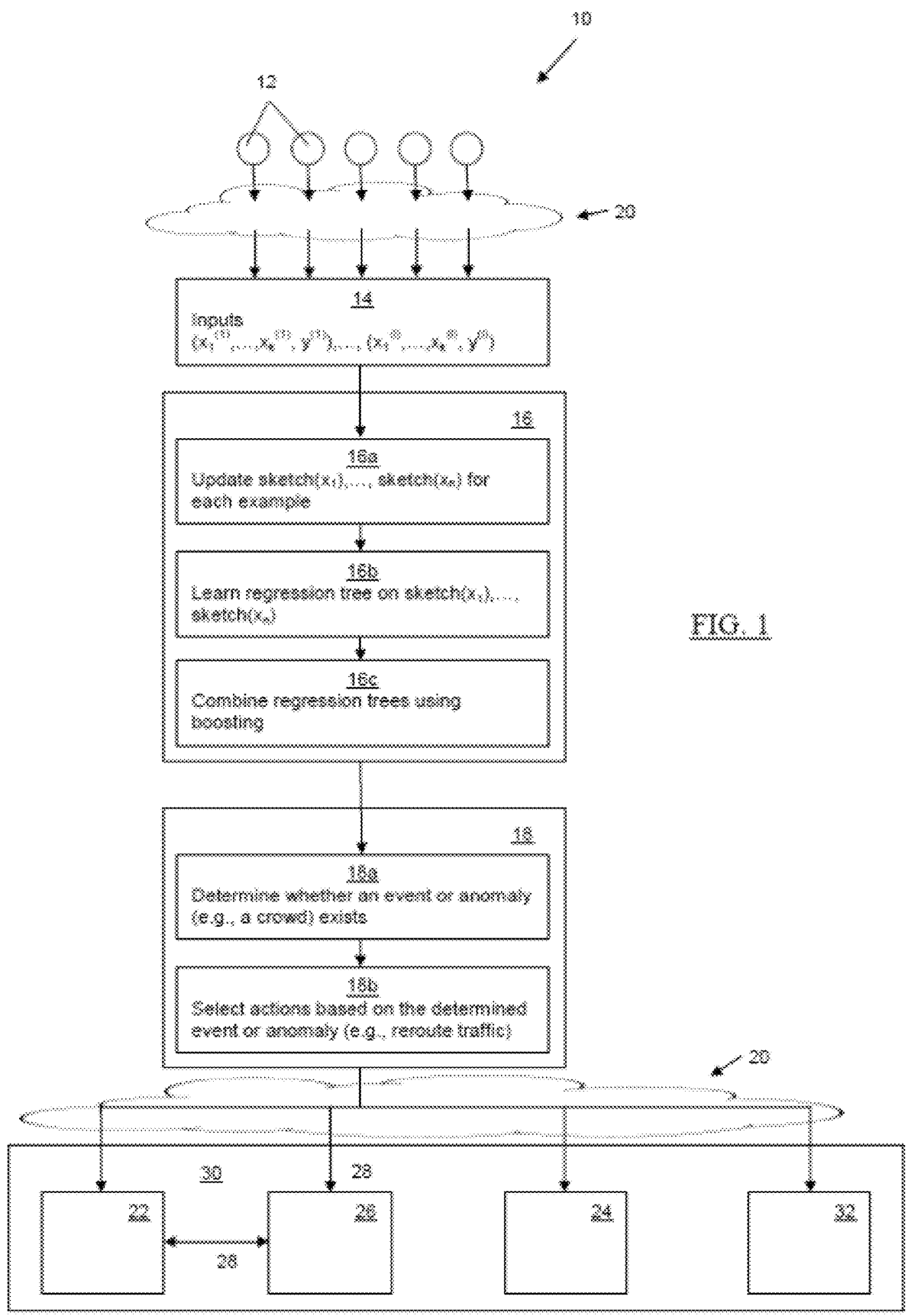
FIG. 1 schematically shows the system according to an embodiment of the present invention.

Embodiments of the present invention utilize novel algorithms for regression tree learning in data streams to achieve real-time processing of massive data streams for event or anomaly detection. Building off summarization techniques, the new algorithms work by running classic regression tree learning algorithms on compact sketches of the original data. Surprisingly, precise theoretical bounds on the complexity and accuracy of the algorithms were achieved. The methods are particularly useful when used with learning trees of small depth and thus can be advantageously applied to ensemble tree learning methods.

The inventors have recognized there are several drawbacks of sampling based algorithms when applied to regression tree learning. First, it is not immediately clear how to address arbitrary distributions in the example weights. Also, assuming categorical features, there may exist important, but less frequent feature combinations that are likely to be underrepresented in the sample. In embodiments of the present invention, the approach is drastically different from previous algorithms. In an embodiment, the presented algorithm is a randomized approximation algorithm with rigorously understood complexity. The algorithm assumes categorical features. However, embodiments of the present invention advantageously utilize different discretization methods that allow to handle real valued features. In different or the same embodiments, the present invention also provides a method and system for the efficient evaluation of min-wise independent hash functions over a set of consecutive integers, a problem that can be of independent interest. An experimental evaluation on real and synthetic data indicates that the proposed method is of practical importance.

In addition to being able to process increasingly larger streams of data in real-time and avoiding the problems of sampling, embodiments of the present invention provide for determining concrete actions to be taken based on the type of event or anomaly that is determined to exist. For example, the system can be connected to a network to tap to receive online user activity and provide targeted advertising or user recommendations. In another embodiment, the system can monitor airport information and provide automatic flight alerts, reroute airplanes to different terminals, schedule departures, manage aircraft maintenance or predict flight delays and reschedule flights. In a preferred and particularly useful embodiment, the system can be connected to a large-scale sensor network to detect crowds and provide a number of different actions such as automatically triggering alerts or warnings or opening/closing routes to streets and highways.

As general preliminaries, let $S=e_1, e_2, \ldots$ be a continuous stream of training examples. It holds $e_i=(x^i, w(e_i))$, $x^i=(f_1^i=x_1^i, \ldots, f_d^i=x_d^i)$ being a d-dimensional vector of feature assignments and $w(e_i) \in \mathbb{N}$ the weight of the example. It is assumed that the feature values $x_j^i$ are drawn from a finite domain. The set of features is denoted by $\mathcal{F}$ and the set of possible assignments to feature $f^i \in \mathcal{F}$ as $X^i$. Sets of feature values are considered in conjunctive normal form (CNF), i.e., a conjunction of disjunctions, where disjunctions represent different possible assignments to a feature. A given CNF of feature assignments is called a profile. A given training example $(x^i, w(e_i))$ complies with a profile $(x_1^1 \vee \ldots \vee x_{k_1}^1) \wedge \ldots \wedge (x_1^r \vee \ldots \vee x_{k_r}^r)$ iff for all $j \in [t]$, where $[t]$ denotes the set $\{1, \ldots, t\}$, there exist $l \in [k_j]$, $x \in x^i$ such that $x=x_l^j$. Each disjunction is represented by one feature in the example. The goal is to learn a regression tree with leafs corresponding to different profiles such that for each leaf it is possible to learn a prediction for the weight of the examples that comply with the corresponding profile.

The examples in S complying with a profile P are denoted as $S_P$. An example $e_i$ complying with P is denoted as $e_i \triangleright P$. Abusing notation, when clear from the context we write P for both the profile P and the examples in $S_P$. $\|P\|_l = \Sigma_{e_i \triangleright P} w(e_i)^l$, i.e., $\|P\|_l$ is the l-th power of the l-norm of the vector of example weights in $S_P$.

An algorithm returns an $(\epsilon, \delta)$-approximation of some quantity q if it returns a value $\tilde{q}$ such that $(1-\epsilon) q \leq \tilde{q} \leq (1+\epsilon) q$ with a probability of at least $1-\delta$ for every $0<\epsilon, \delta<1$.

A node in a regression tree contains the examples complying with a given profile, the root being the empty profile complying with all examples. Each example in the dataset can be assigned to a unique leaf in the tree. Let $\mathcal{P}$ be the set of possible profiles. At each leaf, a prediction function $f: \mathcal{P} \to \mathbb{R}$ is maintained for the corresponding profile. A loss function $L: \mathcal{P} \to \mathbb{R}$ is defined. $f$ is preferably the mean weight $\mu(P)$ of examples complying with a given profile P, and for L—the mean squared error $$MSE(P) = \frac{1}{\|P\|_0} \sum_{e_i \triangleright P} (w(e_i) - \mu(P))^2.$$

A leaf of the tree is split by extending the corresponding profile with a disjunction of features that yield the maximum reduction in the loss function.

The presented algorithms also build upon min-wise independent permutations. Assume two sets A, $B \subseteq U$, are given for a totally ordered universe U. Let $$\alpha = \frac{|A \cap B|}{|A \cup B|}$$

be the Jaccard similarity between A and B. A random permutation $\pi: U \to U$ is defined. Let $x=\min(\pi(A \cup B))$, i.e., x is the minimum value under $\pi$ in $A \cup B$. Let X be an indicator random variable such that X=1 iff $x \in A \cap B$. The expected value of X is $E[X]=\alpha$. By the sample bound, for $$O\left(\frac{1}{\alpha \epsilon^2} \log \frac{1}{\delta}\right)$$

random permutations and computing the fraction of "minimum" elements from $A \cup B$ that are also in $A \cap B$ yields an $(\epsilon, \delta)$-approximation of $\alpha$. The unknown parameter $\alpha$ is used for description purposes as a short form of the following more precise statement: Using space $$O\left(\frac{1}{\alpha \epsilon^2} \log \frac{1}{\delta}\right),$$

it is guaranteed that (i) if the similarity is at least $\alpha$, then an $(\epsilon, \delta)$-approximation is obtained, (ii) otherwise, a value is returned that is below $(1+\epsilon)\alpha$ with the probability $1-\delta$. The approach is applied in a streaming setting by replacing the random permutation $\pi$ with a suitably defined hash function $h: U \to D$, for some totally ordered set D. A truly random hash function would require to store a random value for each element in the universe U. This leads to use of approximately min-wise independent hash functions.

A family $\mathcal{H}$ of functions from a set X to a totally ordered set S, $h: X \to S$, is referred to as $\epsilon$-minwise independent if for any $x \in X$:

$$Pr\left[h(x) < \min_{y \in X \setminus \{x\}} h(y)\right] = \frac{1 \pm \epsilon}{|X|}$$

$\epsilon$ can be omitted and h can be called minwise independent.

The above approach is also referred to herein as k-mins sketches as the minimum element for each of k different permutations is stored. A modification of the above approach, also referred to herein as bottom-k sketches, stores the k smallest hash values from a given permutation π. Let $\min_k^\pi(A)$ be the k smallest elements in A under π. An estimator of $$\alpha = \frac{|\bigcap_{i=1}^t A_i|}{|\bigcup_{i=1}^t A_i|}$$

is then $$\frac{|\bigcap_{i=1}^t \min_k^\pi(A)|}{k}.$$

An advantage of the second approach is that significantly fewer hash functions are required, thereby advantageously providing faster processing time. Preferably, the hash functions in this case are more randomized.

In an embodiment, the proposed algorithm uses set size estimation as a subroutine. One possible approach for this subroutine is described in Bar-Yossef, Ziv, Jayram, T. S., Kumar, Ravi, Sivakumar, D., and Trevisan, Luca, "Counting distinct elements in a data stream," in Randomization and Approximation Techniques, 6th International Workshop, RANDOM 2002, pp. 1-10, 2002, which is hereby incorporated herein by reference. Assume a data stream is given of integers $u_1, u_2, \ldots$ and the goal is to estimate the number of different integers. A uniform "random enough" hash function can be assumed by h: $\mathbb{N} \to (0, 1]$. Also, it is assumed that with high probability the function is injective, i.e., there are no collisions. Then $h(u_i)$ is evaluated for each incoming $u_i$ and the k smallest hash values are stored. Let $v_k$ be the k-th smallest hash value. An estimate of the number of different integer values is then $k/v_k$. If there are less than k different hash values, then the result will be the exact value whp. The intuition is that the more different integers there are, the smaller hash values that are obtained. If the hash values are uniformly distributed over the (0, 1] interval, then a fraction of γn is expected to be smaller than y $\in$ (0, 1], n being the number of different values. Thus, it is expected that $k=v_k n$. It suffices that the function h is only pairwise independent in order to obtain an $(1\pm\epsilon)$-approximation with error probability below ½. The median of $$O\left(\log \frac{1}{\delta}\right)$$

independent estimates is then an $(\epsilon, \delta)$-estimate of the number of distinct elements.

According to an embodiment, min-wise independent hashing can be applied to the estimation of the generalized Jaccard similarity $$\alpha = \frac{|\bigcap_{i=1}^t A_i|}{|\bigcup_{i=1}^t A_i|} \text{ for } t \geq 2.$$

Further, the sets $A_i$ can be the union of several sets $A_i^1, \ldots, A_i^r$: for each set $A_i^j$ we keep a min-wise sample mw s $(A_i^j)$ and after processing the stream the minimum hash value(s) are taken from $\bigcup_{j=1}^r mws(A_i^j)$. In the same way, it is possible to estimate $|\bigcup_{i=1}^t A_i|$, and thus estimate the size of the set intersection $\bigcap_{i=1}^t A_i$.

Also, according to an embodiment, a main building block in the algorithm is the estimation of $\|P\|_l$ for different profiles P. W.l.o.g. assumes that the example weights are integer numbers. Each example with weight w is considered as the continuous arrival of $w^l$ consecutively numbered unweighted examples. With each feature, a set of integers is associated and these sets are summarized. From the summaries, the generalized Jaccard similarity $$\frac{\|F_1 \wedge \ldots \wedge F_t\|_l}{\|\bigcup (f_i \in F_1 \vee \ldots \vee F_t)\|_l}$$

is estimated and the union size $\|\bigcup(f_i \in F_1 \vee \ldots \vee F_t)\|_l$ for a profile $P = F_1 \wedge \ldots \wedge F_t$.

A high level pseudocode description of the data summarization algorithm is provided below as a streaming algorithm for estimating the l-norm of a given profile. Three sketches are kept for each feature $f \in \mathcal{F}$: one for the estimation of the l-norm, $l \in \{0, 1, 2\}$. The sketches are updated in a streaming fashion. Each new incoming example consisting of k features, one feature per category, will update 3k sketches that will be used to estimate the $\|P\|_l$ values.

Process Stream

```
Input: stream S of weighted examples e_i = ([f_1, f_2, ..., f_k], w(e_i))
1: c_0 = 0, c_1 = 0, c_2 = 0
2: for e_i ∈ S do
3:    for l = 0 to 2 do
4:       Let R be a min-wise independent sample from
              {c_l + 1, ..., c_l + w(e_i)^l}.
5:       for f_j ∈ e_i do
6:          Update sketch sk_l[f_i] with R.
7:       c_l = c_l + w(e_i)^l
```

Estimate Weight

```
Input: profile P = [F_1 ∧ ... ∧ F_t], power l ∈ {0, 1, 2}, sketches sk_l
1: J_P = estimate the generalized Jaccard similarity of P from the sketches
        sk_l [f_1], ..., sk_l[f_t], f_i ∈ P
2: U_P = estimate the size of the union || ∪ f_i : f_i ∈ P ||_l
3: Return J_P · U_P
```

In order to build a regression tree, the prediction and error functions for each candidate split is computed. The mean and MSE loss for a given profile P can be computed in terms of three $\|P\|_l$ values. Thus, once the data is summarized, it is possible to learn a regression tree from the sketches. In an embodiment, a standard regression tree algorithm is run, but instead of using the original data, the quality of a split from the sketches is estimated. An exemplary pseudocode for the proposed algorithm is given in FIG. 2. The tree is denoted as T and an internal node or a leaf representing a profile P—as T[P]. Note that T[P] contains the same examples as $S_p$. In the following, bounds on sketch sizes are described which can be used to compute an approximately correct split.

For real-valued features, instead of selecting a subset of the features, a split point s is selected and the data is split depending on whether the given feature value is less than or larger or equal to s. Real values are mapped to a finite number of values. The goal is to preserve as much as possible the quality of the original splits. It is assumed that feature values are drawn from a universe U of cardinality u. In some embodiments, different feature discretization options are utilized.

For fixed summarization points, feature value v is projected to v div k. This results in u/k features. Another option is that a feature value v is projected to $\hat{v}=\lfloor \log_{1+\gamma}v \rfloor$ for a user-defined $\gamma>0$. This assures that $(1+\gamma)^{\hat{v}}$ will be an $(1-\gamma)$-approximation of v. The total number of values is bounded by $\log_{1+\gamma}u$. These methods are static in the sense that the discrete features are independent from the data distribution. However, for certain types of numeric features they yield good results, in particular if there is some predetermined information on the range of the values.

For mergeable histograms, a histogram is maintained that dynamically adapts to the distribution of the feature values. The histogram consists of b bins, for a user-defined b. For a new feature value a new bin is created. If the number of bins exceeds b, then the two bins closest to each other are merged. The minwise independent sketches can be merged, thus it has been advantageously discovered that this option applies to embodiments of the present invention. The algorithm is heuristical and no precise bounds on the quality of the approximation can be obtained. However, it has been empirically shown to yield excellent results for a variety of distributions.

For approximate quantiles, a dataset D of n elements is given, an element d∈D is an $\epsilon$-approximate $\varphi$-quantile if it has a rank between $(\varphi-\epsilon)n$ and $(\varphi+\epsilon)n$ in D. An extension of the q-digest algorithm can be used. It is assumed the values are in the range $[1, \sigma]$. A data structure is maintained that represents a binary tree with $\sigma$ leafs. An inner node t corresponds to a given interval [t. min, t. max]. Each node y has a counter t. count for the number of values in [t. min, t. max]. Each incoming value is assigned to a leaf and the counter is updated. Let n be the number of values seen so far in the stream. Let t. l and t. r be the left and right child of an internal node t. For each internal node t it is maintained the invariant that t. count≤$\epsilon$n and t. count+$t_l$. count+$t_r$. count>$\epsilon$n. If the condition is violated, then the three nodes t, $t_l$, $t_r$ are merged into t and add up the counters. In this way, at most 1/$\epsilon$ leafs are explicitly stored. The intuition is that non-frequent values will be collected in higher-level nodes, as these contribute less to correctly identifying approximate quantiles. Looking for a $\varphi$-quantile, the tree is then traversed in post-order by, i.e., by increasing t. max values. Once for some t the sum of the counts become more than $\varphi$n, t. max is reported as an $\epsilon$-approximate $\varphi$-quantile.

The q-digest data structure is then used to obtain a list of 1/$\varphi$ $\epsilon$-approximate $\varphi$-quantiles $\varphi$n, 2$\varphi$n, . . . , $\varphi$>$\epsilon$. In addition to the counts, at each node the minwise samples are also stored. When the nodes are merged, the minwise samples are updated in the same way as when computing the minwise sample of a CNF. Thus, the error can be estimated when splitting on approximate $\varphi$-quantiles for arbitrary data distribution.

While the space complexity of the algorithms can be analyzed as described above, in various embodiments, the processing time per example is a main factor in providing for particular applications. Given an example $e_i$ with weight w($e_i$) and a hash function h: $\mathbb{N} \to (0, 1]$, it is necessary to find the minimum hash value of evaluating h on w($e_i$) consecutive integers. Explicitly evaluating h w($e_i$) times might be prohibitively expensive.

Rigorous theoretical results can be obtained when implementing the hash functions $h_j$ using tabulation hashing. It is assumed all keys come from a universe $\mathcal{U}$ of size n. With tabulation hashing, each key r∈$\mathcal{U}$ is viewed as a vector consisting of c characters, $r=(r_1, r_2, \ldots, r_c)$, where the i-th character is from a universe $\mathcal{U}_i$ of size $n^{1/c}$. W.l.o.g. assumes that $n^{1/c}$ is an integer. For each universe $\mathcal{U}_i$, a table $T_i$ is initialized and for each character $r_i \in \mathcal{U}_i$ a random value $v_{r_i}$ is stored. Then, the hash value is computed as:

$$h_0(r) = T_1[r_1] \oplus T_2[r_2] \oplus \ldots \oplus T_c[r_c]$$

where $\oplus$ denotes the bit-wise XOR operation. Thus, for a small constant c, the space needed is $O(n^{1/c} \log n)$ bits and the evaluation time is O(1) array accesses. For example, keys are 64-bit integers and c=4. Tabulation hashing yields only 3-wise independent hash functions. However, it yields $\epsilon$-minwise independent hash functions with $$\varepsilon = O\left(\frac{\log^2 n}{n^{1/c}}\right).$$

In order to design algorithms for the fast update of k-mins and bottom-k sketches the following problems can be taken into consideration.

Definition 1: MinHashValue (W, q, $\kappa$): Given a hash function h: $\mathbb{N} \to (0, 1]$ and $\kappa$, q∈$\mathbb{N}$, q≤W, find the minimum value in $\{h(\kappa+1), \ldots, h(\kappa+q)\}$, q≤W.

Definition 2: MinKHashValues (W, q, $\kappa$, k, $\tau$): Given a hash function h: $\mathbb{N} \to (0, 1]$ and $\kappa$, q∈$\mathbb{N}$, q≤W, find the minimum at most k values in h($\kappa$+1), . . . , ($\kappa$+q)), q≤W, which are smaller than $\tau$.

Theorem: Let h: $\mathbb{N} \to (0, 1]$ be implemented using tabulation hashing with parameters n and c. Let W≤$n^{1/c}$. After preprocessing in time O(W log W) and space O(W), solve the MinHashValue (W, q, $\kappa$) in time O(log W). The MinHashValue (W, q, $\kappa$, $\tau$) is solved in time O($\kappa$+log W) after preprocessing in time and space O(W log W).

Since W≤$n^{1/c}$, it is assumed that for $\{h(\kappa+1), \ldots, h(\kappa+q)\}$ there will be at most two different possibilities of the tables $T_1, \ldots T_{c-1}$, i.e., the leading bits of the integer numbers $\kappa+1, \ldots, \kappa+q$ might change only once. Thus, a data structure is needed that will support queries like "Given a bit vector b, find the element x in D such that b$\oplus$x is minimal and rank(x)≤rank (b)." In a preprocessing phase, a binary search tree B is built consisting of value-rank pairs (v,r) supporting queries of the form "Given a query (q,$r_q$), output the pair (v,r)=argmin$_v$(v≥q,r≤$r_q$). There are W pairs such that (v,r)=(h(i),i), 1≤i≤W. Pairs are compared according to the value v. The root of each subtree records the minimum rank of a pair in the subtree. A standard search is performed for the smallest v≥q and at each internal node the rank of the subtree is checked that contains the elements. If the minimum rank is more than the query rank $r_q$, then all elements in the subtree are outside the query range. In such a case, it is possible to either inspect the other branch or backtrack. Backtrack is only done if the tree contains both elements smaller and larger than q. In such a case, a subtree is reached with elements larger than q and minimum rank larger that $r_q$. However, this is a unique tree and it might be that backtrack is done at most once. Once a tree is reached where all elements are larger than q and the minimum rank is less than $r_q$, it can be found in time O(log W) the smallest element with rank less than $r_q$. The tree B can be build in time O(W log W) and needs space O(W).

For MinKHashValues (W, q, $\kappa$, k, $\tau$), a data structure is provided that supports range queries of the form "Given a query (q,$r_q$), output the (at most) k smallest values in the interval [q,q+$\tau$] which have rank at most $r_q$. Again, a binary search tree B is built. At each root, an array is stored consisting of the elements in the subtree sorted according to their rank. The intervals are then determined, i.e., the nodes in B, which cover [q,q+$\tau$]. There are at most log W such intervals which can be found in time O(log W). Let l be the list of found intervals. The intervals in l are pairwise disjoint and all elements in a given interval are strictly smaller or larger than all elements in the other intervals. The elements are output from l starting with the leftmost interval until the rank of the output element is less than $r_q$. It is stopped when there is either an output of k elements or all intervals are inspected in l. The time for sorting the elements and the space usage is O(W log W) and once the set of relevant intervals have been identified, each hash value can be computed in constant time.

A drawback of using the mean value for prediction is that can be sensitive to outliers. As an alternative, the median value of examples complying with profile P, $med_p$ can be used. The corresponding error function is the l-norm of the vector $w(e_i)-med_p$, i.e. $\sum_{e_i \rhd P} |w(e_i)-med_p|$.

The following definition of median approximation can then be taken into consideration:

Definition 3: Let U be a totally ordered set and $A \subseteq U$ be a sorted array over n elements. An element $a_i \in A$ is called a positional ϵ-approximation of med(A) if $(\frac{1}{2}-\epsilon)n \leq i \leq (\frac{1}{2}+\epsilon)n$.

The median is estimated using minwise independent hashing based sampling. For each feature, a k minwise independent hash function $h_j$ is maintained, for k to be specified later. For each $h_j$, the weight $w(e_i)$ is kept for which $h_j(e_i)$ is minimum. For a given profile $P=(f_1^1 \vee \ldots \vee f_k^1) \wedge \ldots \wedge (f_1^r \vee \ldots \vee f_s^r)$, the $w(e_i)$ is computed with the minimum hash value for each disjunction. Then, the $w(e_i)$ is retained that are presented in all disjunctions in the profile and the median of these is returned. The following theorem gives a bound on the required number of samples k.

Theorem 3: Let $A_1, \ldots, A_t$ be weighted sets such that $$\alpha = \frac{|A_1 \cap \ldots \cap A_t|}{|A_1 \cup \ldots \cup A_t|}.$$

Using $$s = O\left(\frac{1}{\alpha \epsilon^2} \log \frac{1}{\delta}\right)$$

a positional ϵ-approximation is computed of the median of $A_1 \cap \ldots \cap A_t$.

In order to estimate the Least Absolute Deviation (LAD) error, a p-stable distribution method is adjusted to the particular setting being used in the embodiments of the present invention.

Definition 4: A distribution $\mathcal{D}$ over $\mathbb{R}$ is called p-stable, $p \in (0, 2]$, if for any $a_1, a_2, \ldots, a_n \in \mathbb{R}$ and i.i.d. $X_1, X_2, \ldots, X_n \sim \mathcal{D}$, it holds $\sum_{i=1}^n a_i X_i$ is distributed as $\|(a_1, \ldots, a_n)\|_p X$, for $X \sim \mathcal{D}$.

The standard Cauchy distribution $\mathcal{D}_c$ with density function $$f(x) = \frac{1}{\pi(1+x^2)}$$

is known to be 1-stable. Given a vector $a=(a_1, \ldots, a_n)$, $\|a\|_1$ can be estimated by the following algorithm. Generate k random vectors $v_i \in \mathbb{R}^n$ such that $v_{i,j} \sim \mathcal{D}_C$, i.e., each vector entry is drawn from a Cauchy distribution. Then, a is summarized as $sk(a)=(\sum_{j=1}^n a_j v_{1,j}, \ldots, \sum_{j=1}^n a_j v_{k,j})$. For $$k = O\left(\frac{1}{\epsilon^2} \log \frac{1}{\delta}\right)$$

the median of sk(a) is an (ϵ,δ)-approximation of $\|a\|_1$. The algorithm can be applied in a streaming setting by generating the random vector entries $v_{i,j}$ on the fly using pseudo-random generators.

Let $I^+ = \{i \in \mathbb{N}: v_{l,i} \geq 0\}$ and $I^- = \{i \in \mathbb{N}: v_{l,i} < 0\}$.

Let $P^+ = \{e_i \rhd P: i \in I^+\}$ and $$\alpha^+ = \frac{\sum_{e_i \rhd P: i \in I^+} v_{l,i}(w(e_i) - med_P)}{\sum_{e_i \rhd f: f \in P, i \in I^+} v_{l,i}(w(e_i) - med_P)}$$

$P^-$ and $\alpha^-$ are defined analogously. In order to estimate the LAD error using the above approach, the median value must be known in advance. Instead, we will run the algorithm is run in parallel and right value of $med_p$ is estimated. The following result is obtained.

Theorem: Let u be the universe size and $\alpha_+$, $\alpha_-$ defined as above. The LAD error for an (γ,δ)-approximation of the positional ϵ-approximation of the median can be computed using space $$O\left(\frac{1}{\gamma \min(\alpha_+, \alpha_-) \epsilon^4} \log \frac{1}{\delta} \log u\right).$$

In an embodiment, the algorithm is applied to learning boosted regression trees in a streaming setting as follows. For a prefix of the stream, a regression tree is learnt. Once the tree has been learnt, it is applied to the next chunk of the stream and the weights are updated as $L(w(o_i), \tilde{w}(o_i))$ where $\tilde{w}(o_i)$ is the predicted weight and $L: \mathbb{R}^+ \times \mathbb{R}^+ \to \mathbb{R}^+$ is the loss function, e.g., $L(w(o_i), \tilde{w}(o_i))=(w(o_i)-\tilde{w}(o_i))^2$. The algorithm applies to random forests where trees of small depth are learnt using feature bagging, i.e., each tree is learnt from a random subset of the features.

In an embodiment, several passes over the data can be made to iteratively learn a tree of arbitrary depth. Assume in the i-th pass, there is learned a tree $T_i$, $T_0$ being the empty tree. In the (i+1)-th pass, the examples are navigated to the corresponding leafs and in each leaf a new tree of small depth is learnt.

In experiments, the algorithm was implemented in Python and performed on a laptop with a 2.7 GHz CPU and 8 GB of main memory. The hash functions were implemented using tabulation hashing for a universe size of $2^{64}$ and c=4. Therefore, the 4 tables consist each of $2^{16}$ random numbers and thus can be loaded in fast CPU cache. The random numbers are from the Marsaglia Random Number CDROM. Bottom-k sketches were used as they allow for especially increased fast processing of examples in the stream.

The experiments showed that using bottom-k sketches, a good approximation of the desired quantities were obtained. It is noted that rigorous theoretical results hold only for min-k sketches as tabulation hashing is only 3-wise independent. However, min-k sketches lead to very slow processing time. Real data hash functions often work better than suggested by the conservative theoretical analysis and explaining this behavior is an active research area.

Three datasets were used for the experimental evaluation: Flights, Network and Housing. The Flights dataset consists of flight arrival and departure details for all commercial flights within the USA, from October 1987 to April 2008. Three features were selected (Origin, Destination and Carrier) and all flights with a delay between 1 and 240 minutes were considered. The Network dataset is a dataset that describes network packets described by different categorical features and a measure of interest. The Housing dataset is an artificial dataset created from the Boston Housing dataset as follows. Three features were selected (Rooms, Distance to five major Boston employment centers and Status indicating the percentage of population in the neighborhood with lower social status). From the original 506 examples, we learnt a regression tree was learnt predicting the value of a house. For each of the three feature categories, the mean and the standard deviation was computed. Then, examples were created with feature values sampled from a normal distribution using the computed mean and standard deviation. For each example, the value was predicted using the learnt tree. The information on the dataset are summarized in Table 1.

TABLE 1

Information on evaluation datasets. $\mu$ and $\sigma$ denote the mean and standard deviation of the example weights.

| Dataset | # examples | # features | $\mu$ | $\sigma$ |
|---|---|---|---|---|
| Flights | ≈5.8 · 10$^7$ | 696 | 23.94 | 37.02 |
| Network | ≈1.2 · 10$^7$ | 27 | 493.3 | 375.6 |
| Housing | 10$^7$ | 72 | 22.73 | 6.31 |

The first three levels of a regression tree were computed using a standard regression tree algorithm that first sorts the features in a given category by the corresponding mean values and then splits according to the largest reduction in mean squared error (MSE). In Flights, the relative sizes in sorted order are as follows 0.0091, 0.0192, 0.02, 0.041, 0.056, 0.105, 0.107, 0.642. The same skew of the $\|P\|_0$ values was observed in the other two datasets. Thus, sampling at random would result in an insufficient number of samples for some of the profiles.

The running time for the implementation that explicitly evaluates the hash function $w(e_j)^i$ times was compared to the improved implementation according to an embodiment of the present invention. For the Flights dataset, the first 3 million examples are processed in about 160 minutes and 5 minutes, respectively, including the preprocessing time. The time savings for Housing are somewhat smaller, 30 vs. 5 minutes for the first three million examples. For the Network dataset, it took one hour to process less than 15,000 examples when applying the explicit hash function evaluation.

Table 3 shows a summary of the results of two feature classes and Table 4 shows a summary of the results of three feature classes.

TABLE 3

Summary of results. 2 feature classes. The Jaccard similarity for Flights is 0.103, for Network −0.297, and for Housing −0.142

| Dataset | s | P$_0$ | P$_1$ | P$_2$ | $\mu$ | MSE |
|---|---|---|---|---|---|---|
| Flights | 1,000 | 1.031 | 1.045 | 1.023 | 0.014 | 0.065 |
|  | 2,500 | 0.994 | 1.033 | 0.997 | 0.039 | 0.083 |

TABLE 3-continued

Summary of results. 2 feature classes. The Jaccard similarity for Flights is 0.103, for Network −0.297, and for Housing −0.142

| Dataset | s | P$_0$ | P$_1$ | P$_2$ | $\mu$ | MSE |
|---|---|---|---|---|---|---|
|  | 5,000 | 0.987 | 1.015 | 0.996 | 0.028 | 0.057 |
|  | 10,000 | 1.001 | 1.022 | 0.994 | 0.021 | 0.010 |
| Network | 1,000 | 0.991 | 0.988 | 0.994 | 0.004 | 0.011 |
|  | 2,500 | 0.998 | 0.974 | 0.993 | 0.025 | 0.049 |
|  | 5,000 | 0.984 | 0.983 | 0.993 | 0.002 | 0.019 |
|  | 10,000 | 0.993 | 0.990 | 1.002 | 0.003 | 0.025 |
| Housing | 1,000 | 1.013 | 1.006 | 1.026 | 0.007 | 0.004 |
|  | 2,500 | 0.995 | 1.013 | 1.018 | 0.018 | 0.051 |
|  | 5,000 | 0.993 | 1.007 | 0.989 | 0.014 | 0.046 |
|  | 10,000 | 0.994 | 1.016 | 0.998 | 0.022 | 0.061 |

TABLE 4

Summary of results. 3 feature classes. The Jaccard similarity for Filghts is 0.0192, for Network −0.645, and for Housing −0.087.

| Dataset | s | P$_0$ | P$_1$ | P$_2$ | $\mu$ | MSE |
|---|---|---|---|---|---|---|
| Flights | 1,000 | 1.111 | 1.007 | 0.907 | 0.094 | 0.215 |
|  | 2,500 | 0.988 | 0.981 | 1.033 | 0.009 | 0.052 |
|  | 5,000 | 1.023 | 0.998 | 1.006 | 0.025 | 0.028 |
|  | 10,000 | 0.994 | 0.978 | 0.991 | 0.017 | 0.018 |
| Network | 1,000 | 1.021 | 0.972 | 0.979 | 0.048 | 0.172 |
|  | 2,500 | 1.028 | 0.992 | 0.977 | 0.035 | 0.032 |
|  | 5,000 | 1.025 | 0.988 | 0.982 | 0.037 | 0.072 |
|  | 10,000 | 1.014 | 1.019 | 0.994 | 0.005 | 0.138 |
| Housing | 1,000 | 1.038 | 1.008 | 0.927 | 0.029 | 3.392 |
|  | 2,500 | 0.972 | 1.002 | 0.970 | 0.031 | 4.264 |
|  | 5,000 | 0.982 | 1.012 | 0.997 | 0.032 | 2.781 |
|  | 10,000 | 0.996 | 1.004 | 0.999 | 0.008 | 0.861 |

If in some cases, the $\|P\|_2/\|P\|_0$ additive approximation term is problematic for certain weight distributions, one immediate remedy would be to map the weight values to a smaller domain by considering only the k most significant bits.

As discussed above, one particular preferred application is for crowd detection. Traditional approaches to addressing the problem of crowd detection include subsampling, dimensionality reduction and data summarization. Embodiments of the present invention provide a new summarization algorithm that uses compact sketches preserving the key properties of the original data. With these sketches, it is possible to learn a regression tree that will approximate a regression tree learned from the original data. The method and system are particularly well suited for handling massive high-speed data streams, processing larger amounts of data and/or decreasing the amount of computational resources required for such purpose in a far more expedient fashion than in the prior art, in real-time. The following describes a particular application of an embodiment of the present invention in large-scale sensor networks.

In an embodiment, the present invention provides a new system and method for crowd detection in large-scale sensor networks. Sensor networks are becoming increasingly more common and complex in a number of locations in which a multitude of different data collected by the sensors, such as crowd levels, traffic levels, air quality measurements, sound levels, etc. are used, for example, for decision making, planning, etc. Such locations having such sensor networks are hereinafter referred to as Smart Cities. The system and method according to embodiments of the present invention can be used for crowd flow detection and management. In practice, the present invention makes it possible to ingest, process and then analyze very large quantities of data in real-time, and update the models as required, before scheduling actions to be executed. In an embodiment, the system significantly builds off and advances state-of-the-art data summarization techniques and scales to massive input in order to be able to analyze the incoming data in real-time and update the generated models.

In one embodiment it is possible i) to be able to make use of all the data, from the different available sources, in real-time, so as to take intelligent actions, and ii) to be able to update the models built using embodiments of the present invention about the behaviors of sensors quickly, in order to keep up to date with changes in environment (concept drift).

In the context of Smart Cities, numerous different sensors collect different types of data from different locations across the city. At given time intervals, these sensors each send a summary of the observed movements, e.g., the observed number of objects that have been detected by the sensor, or the current noise or pollution level. Each observation is described by different features, such as month, week, day, hour, temperature, noise-level, pollution-level, etc. Data is sent from sensors to a data center where it is analyzed. Data can also include position location (GPS signals from GPS-enabled devices such as smartphones) from individual user devices, for example, as described in U.S. patent application Ser. No. 14/100,098 of the Applicant which is hereby incorporated by reference herein in its entirety and which describes a method which is useable in combination with embodiments of the present invention. For example, monitored areas can be subdivided as described in that application to provide further monitoring within the sensor network and/or to provide crowd related information for areas not covered by other sensors.

From this data (different feature combinations), an embodiment of the present invention provides the ability to learn a "typical" distribution for the observations from a given sensor. For example, if the sensor is located on a large street in the center of a big city, and the measurement is taken on Friday evening, then it should be normal to detect 100 people in a 30-seconds interval. But this same measurement should be anomalous for a small city on a Monday afternoon. Once the typical behavior of a sensor is learnt, this information can be used to trigger actions such as changing the route that crowds might take, for example by opening and closing routes to/from a given street or location, alerting appropriate officials or law or traffic enforcement or triggering alarms, alerts or warnings.

Consider a large area covered by thousands of sensors that continuously monitor it and send back observations. A possible solution to the problem of identifying anomalous situations is to learn an offline-model and then, for each incoming sensor observation, to compare the observation to the prediction generated by the model. However, the distribution for expected observations can at times change very fast, but only last temporarily. For example, people are gathering for important event, say a football game, a concert, or a political demonstration. Sometimes such gatherings are not scheduled, but do not necessarily represent a threat for the public and are not the result of an emergency situation. In such cases, after initially triggering an alarm, it is desirable in an embodiment of the present invention that no more alarms are triggered. In order to achieve this, the learnt models are updated in an especially expedient fashion.

Embodiments of the present invention provide a novel stream-based regression tree algorithm to learn the expected (typical) distributions of combinations features as collected by the sensors. Once learnt, the regression trees are used to identify anomalous situations and decide how to act. For example, in the context of Smart Cities, crowds can be managed by determining how to efficiently distribute and handle large groups of people.

The intuitive idea behind regression trees is to partition the data according to different feature configurations and learn a distribution for each configuration. The objective is to detect the most informative feature configurations. Unsurprisingly, regression trees are one of the most widely used non-parametric machine learning methods. A drawback, however, is that the classic algorithms assume that data is loaded in main memory.

Algorithms used in embodiments of the present invention address the two problems mentioned above, namely dealing with very large scale data and handling concept drift in the data, simultaneously. In an embodiment, a scalable regression tree learning system for massive datasets for the application of crowd management is provided. At the core of the system is a new algorithm that creates compact sketches of the original data. A regression tree is learnt on the sketches. The system is scalable since the sketch sizes do not depend on the size of the data, only on certain structural properties of the data. The sketches provide the ability to process high-speed data streams and learn regression trees in real-time.

FIG. 1 provides a schematic overview of the system 10 and high-level functional descriptions of the method according to an embodiment. Data sources 12, in this embodiment comprising sensors, collect measurements and export their features 14 to a computational processor or server 16 via a network 20, for example using cloud computing. In other embodiments, such as for a recommendation system, the data sources 12 can comprise network taps or network usage monitoring devices. The computational processor or server 16 summarizes the features 14, and the regression trees are built/updated in an online manner. With the regression trees in place, it is possible to then compare the current observation from the environment with the expectation from the regression tress, for example using a decision engine 18 trained to determine deviations from the expected result over time which would be considered anomalous or to determine for certain conditions in a location whether the amount of people or objects constitutes a crowd. The decision engine 18 is also configured in embodiments to automatically trigger certain actions upon detecting an anomaly or crowd.

The steps 16a-d and 18a-b illustrated in FIG. 1 can be performed in any combination by the computational processor or server 16 and the decision engine 18, by one of those devices alone, or in combination with further available computational resources. After receiving the features 14 from the installed sensor elements configured to provide the features 14 as a stream of data input, sketches are created in the first instance and then updated in step 16a. A regression tree is learnt on the sketches in step 16b. The regression trees are then combined using boosting in step 16c. Based on a predefined threshold for deviation from expected values determined from the regression trees or a predefined threshold for an acceptable crowd level based on the location being monitored, a decision is made in step 18a whether an anomaly or a crowd exists. Then, based on the type of event or anomaly, certain actions 30 can be automatically triggered, for example based on a type, location or magnitude of the determined event or anomaly. In this embodiment, the type of event or anomaly can be a crowd, and the actions 30 can be based on the crowd location or degree of crowd. For example, where it is determined that an anomaly or crowd exists, an alert could be sent via the network 20 to appropriate public offices 22, alarms 24 could be triggered, roadways or intersections could be automatically opened or closed (for example, using remotely-controllable gates), traffic lights, signals and signs 26 could be adjusted via a traffic communications network 28, signs and displays 32 could be remotely by the decision engine 18, alternative directions could be sent to navigation systems and/or smartphones of users, etc. In the context of other embodiments, such as a recommendation system, the actions 30 could include sending a targeted advertisement or recommendation (for example, for a book or movie) to a user, booking alternative reservations for a flight or hotel (for example, based on weather and/or flight delay inputs), making travel recommendations (for example, using weather and/or flight cost inputs), making housing recommendations, etc. as discussed below.

In an embodiment where the method is used by a recommendation system, the features include can include user categories or types (for example, based on age group or user profiles, demographic, etc.) and a content-type category (for example, clothes, music, movies, etc.) and the measurement includes, for example, a user rating or a number of times a site was visited). In this embodiment, the actions can include sending a targeted advertisement to a user, making a recommendation to the user for a particular type of content or triggering an alert (for example, where the expected result deviates significantly from the actual measurement).

In an embodiment where the method is used in a flight management system, the features can include a time, airports or locations, aircraft or flight parameters, routes, origin, destination, carrier, etc. and the measurement includes, for example, a flight time or a flight delay length. In this embodiment, the actions can include at least one of transmitting instructions to reroute a flight, rescheduling flight departure times or changing arrival gates.

In an embodiment where the method is used in a weather station, the features can include a time, a location, a type (for example, sunny, cloudy, rainy, windy, etc.) and the measurement can include a temperature, a dew point, a pressure, amount of precipitation or a wind speed. In this embodiment, the action can include transmitting a weather alert.

Thus, according to an embodiment, the proposed system works by receiving data from the data sources 12, summarizing data in a suitable way, and learning a regression tree on the summaries. The novel regression tree algorithm learns and updates the predictions for different configurations in real-time.

In classic regression tree learning, a dataset of examples are given that consist of features and a real-valued measure, i.e. ([$x_1, x_2, \ldots, x_k$], y) where $x_i$ are the features and y is the value of the measure of interest. It is assumed the features are categorical. Features are assigned to categories and each example contains only one feature per category. For example, sensor observations that look like [(Frankfurt, city center, Goethestrasse, May, 19 degrees, afternoon, Sunday, cloudy), 67], denoting that 67 people have been detected by the sensor at the above location in Frankfurt under the given time and weather conditions. Categories can include city, location, street, month, temperature, etc.

A tree consisting of a single node that stores the data is created. It is first assumed that the data is stored at the root of the tree. Each leaf node of the tree records the mean of the examples, denoted as µ, falling into this leaf and the MSE of the examples. The MSE for n examples is defined as:

$$\sum_{i=1}^{n}(y^{(i)} - \mu)^2 \qquad \text{(Eq. 1)}$$

It is then attempted to split a leaf node by partitioning the data depending on features such that MSE is minimized. For example, a split can be of the form [city=Frankfurt] vs. [city !=Frankfurt] or [city=Frankfurt or Hamburg] vs. [city=Berlin, Munich, Cologne] (in case sensor data is provided from only these 5 cities). Once it is no longer possible to be able to achieve an MSE reduction above a certain threshold, the system stops splitting a given leaf.

Sets of features are considered in conjunctive normal form (CNF), i.e., a conjunction of disjunctions, where disjunctions are over features of the same category. For example, a profile can look like ([Frankfurt or Hamburg] and [Saturday or Sunday]). An example $e_i$ complies with a given profile P if one feature from each disjunction is represented in the profile, denoted as $e_i \epsilon P$. The examples [(Frankfurt, city centre, Goethestrasse, May, 19 degrees, afternoon, Sunday, cloudy), 67] and [(Hamburg, city centre, Heinestrasse, May, 17 degrees, afternoon, Saturday, cloudy), 55] both comply with the profile ([Frankfurt or Hamburg] and [Saturday or Sunday]). Each internal node of the tree represents a given profile, the root is the empty profile complying with all examples. An example is navigated through the tree until it reaches a leaf of the tree. Note that there is a unique leaf for each example. The l-norm of a given profile P is defined as the sum of the l-th powers of the weight of observations complying with P:

$$\|P\|_l = \sum_{e_i \in P} y_i^l \qquad \text{(Eq. 2)}$$

According to an embodiment, one main building block in the new system is sketching using min-wise independent hashing. For this purpose, a sketch is kept for each feature. From the sketches of different features, it is possible to estimate the $\|P_l\|$ for arbitrary profiles P. For example, the mean and MSE can be re-written as:

$$\mu(P) = \|P\|_1 / \|P\|_0$$

$$MSE(P) = \|P\|_2 / \|P\|_0 - (\|P\|_1 / \|P\|_0)^2 \qquad \text{(Eq. 3)}$$

According to an embodiment, sketching works as follows:

It is assumed that the measures of interest y are natural numbers. Real numbers are internally represented by a fixed number of bits, i.e. integers. Basic knowledge about the data allows to add an offset to each $y_i$. Each example of weight y is treated as a set consisting of $y^l$ consecutive unique integers for l=0, 1, 2. Each feature x is associated with three sets of integers of examples it appears in. For example, if city=Frankfurt appears in 10 examples of total weight 200, then it is associated with sets of 1,200 and 40,000 integers.

These sets are summarized using min-wise independent hashing. One way to summarize using min-wise hashing is described, for example, in Andrei Z. Broder, Moses Charikar, Alan M. Frieze, Michael Mitzenmacher, "Min-Wise Independent Permutations," STOC 1998: 327-336, which is hereby incorporated by reference herein.

From the sketches, the generalized Jaccard similarity for a given profile P is estimated Also, from the sketches, the size of the union of sets that define a given profile P are estimated. Ziv Bar-Yossef, T. S. Jayram, Ravi Kumar, D. Sivakumar, Luca Trevisan, "Counting distinct elements in a data stream" RANDOM 2002: 1-10, which is hereby incorporated by reference herein, provides additional information about how such an estimate can be made.

From the above two estimates, an estimate of $\|P\|_l$ for l=0, 1, 2 is obtained.

A regression tree algorithm is run on the sketches using the estimates of $\|P\|_l$ in order to estimate the mean and MSE.

A pseudocode of the regression tree algorithm according to an embodiment is presented in FIG. 2. The algorithm incrementally builds a regression tree from the sketches of the individual features. As evident from the pseudocode, a main procedure is to estimate the mean squared error from the sketches. It is a simple observation that the MSE of a given profile $P=(x_1, x_2, \ldots, x_t)$, $t \geq 1$, can be computed from $\|P\|_0$, $\|P\|_1$ and $\|P\|_2$.

FIG. 3 shows a plot of the estimated mean for a profile consisting of features over three different categories in the BT dataset. In this particular example, sketches of a size that is less than 5% of the original data were needed. However, the dataset consists of about 3.5 million examples and the space savings become better for really massive datasets.

Thus, embodiments of the present invention provide a crowd detection system and method that is able to quickly learn a regression tree from a summary of sensor data. Min-wise independent hashing for data summarization can be advantageously used as described above so as to enable regression tree learning on massive data streams. In contrast to the straightforward application of min-wise hashing, which would require significant processing time under the present application setting with massive data streams coming from sensors of large-scale sensor networks, embodiments of the present invention extend min-wise hashing to work for this specific setting, and provide an efficient algorithm for the hash function evaluation.

In another embodiment, the present invention provides a method for crowd detection using scalable regression tree learning in massive sensor data streams, the method comprising the steps of:
1) Receiving input from data sensors.
2) Configuring the parameters of the algorithm that summarize the data.
3) Summarizing the data using the algorithm.
4) Running a regression tree on the summarized data.
5) Triggering an alarm or some other action if there is some anomaly significant deviation from the expected result.

The degree to which the deviation from the expected result will be considered an anomaly will depend, for example, upon the learnt behavior over time including expected normal fluctuations or standard deviations from an expected result and/or upon a predefined threshold for variation. For example, an anomaly can be defined as a deviation of 3 standard deviations ±1%.

The use of the above-described sketching techniques and algorithm have been shown to result in well defined savings in computation and storage resources compared to the prior art sampling-based techniques and others which are not suitable for operation in real-time.

The present invention can be implemented as software on-demand, a tangible, non-transitory computer-readable medium, a specially-configured computer processor or server, or a networked system of such devices.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for detecting an event or anomaly in real-time and for triggering an action based thereon, the method comprising:
receiving a stream of data from data sources, the data including at least two categorical features and a real-value measure;
performing sketching on the categorical features using min-wise hashing to create sketches of the data;
learning a regression tree on the sketches so as to minimize a desired loss function;
determining whether the event or anomaly exists; and
triggering the action based on at least one of a type, location or magnitude of the determined event or anomaly.

2. The method according to claim 1, wherein the desired loss function is a mean squared error, wherein the regression tree is built starting with a tree consisting of a single node which stores the data, wherein each leaf node comprises a mean of the real-value measures, and wherein the leaf nodes are split by partitioning the data based on the categorical features until a reduction of the mean squared error above a predetermined threshold is no longer achievable.

3. The method according to claim 2, wherein boosting is applied to the regression tree.

4. The method according to claim 1, further comprising updating the sketches and learning regression trees on the updated sketches.

5. The method according to claim 1, further comprising estimating, from the sketches, a generalized Jaccard similarity for a given profile and a size of a union sets that define the given profile.

6. The method according to claim 1, wherein the method is used in a crowd detection system, wherein the categorical features include at least a time and a location and the real-value measure includes a number of detected objects or persons, wherein the event or anomaly is a crowd, and wherein the action includes at least one of:
- sending an alert to a public office or official;
- automatically opening or closing a road, on-ramp or intersection;
- remotely controlling traffic signals and traffic signs;
- triggering an alarm; or
- sending alternative directions to a navigation-enabled device.

7. The method according to claim 1, wherein the method is used in a recommendation system, wherein the categorical features include at least a user category and a content-type category and the real-value measure includes a user rating, and wherein the action includes at least one of:
- sending a targeted advertisement to a user;
- making a recommendation to the user for a particular type of content; or
- triggering an alert.

8. The method according to claim 1, wherein the method is used in a flight management system, wherein the categorical features include at least a time and a location and the real-value measure includes a flight delay length, and wherein the action includes at least one of:
- transmitting instructions to reroute a flight;
- rescheduling flight departure times; or
- changing arrival gates.

9. The method according to claim 1, wherein the method is used in a weather station, wherein the categorical features include at least a time and a location and the real-value measure includes a temperature, and wherein the action includes transmitting a weather alert.

10. The method according to claim 1, wherein the regression tree is incrementally built by providing the sketches for each of the categorical features as input to a regression tree algorithm which splits leaf nodes depending on estimates of mean squared error from the sketches for each of the categorical features.

11. A system for detecting an event or anomaly in real-time and for triggering an action based thereon, the system comprising at least one server or processor configured to:
- receive a stream of data from data sources, the data including at least two categorical features and a real-value measure;
- perform sketching on the categorical features using min-wise hashing to create sketches of the data;
- learn a regression tree on the sketches so as to minimize a desired loss function;
- determine whether the event or anomaly exists; and
- trigger the action based on at least one of a type, location or magnitude of the determined event or anomaly.

12. The system according to claim 11, wherein the system is a crowd detection system, wherein the categorical features include at least a time and a location and the real-value measure includes a number of detected objects or persons, wherein the event or anomaly is a crowd, and wherein the actions include at least one of:
- sending an alert to a public office or official;
- automatically opening or closing a road, on-ramp or intersection;
- remotely controlling traffic signals and traffic signs;
- triggering an alarm; or
- sending alternative directions to a navigation-enabled device.

13. The system according to claim 11, wherein the system is a recommendation system, wherein the categorical features include at least a user category and a content-type category and the real-value measure includes a user rating, and wherein the actions include at least one of:
- sending a targeted advertisement to a user;
- making a recommendation to the user for a particular type of content; or
- triggering an alert.

14. The system according to claim 11, wherein the system is a flight management system, wherein the categorical features include at least a time and a location and the real-value measure includes a flight delay length, and wherein the actions include at least one of:
- transmitting instructions to reroute a flight;
- rescheduling flight departure times; or
- changing arrival gates.

15. The system according to claim 11, wherein the system is part of a weather station, wherein the categorical features include at least a time and a location and the real-value measure includes a temperature, and wherein the action includes transmitting a weather alert.

16. A tangible, non-transitory computer medium having instructions thereon which when run on at least one processor or server cause the following steps to be performed:
- receiving a stream of data from data sources, the data including at least two categorical features and a real-value measure;
- performing sketching on the categorical features using min-wise hashing to create sketches of the data;
- learning a regression tree on the sketches so as to minimize a desired loss function;
- determining whether the event or anomaly exists; and
- triggering the action based on at least one of a type, location or magnitude of the determined event or anomaly.

* * * * *